Dec. 7, 1965 W. D. ULRICH 3,221,719
AUTOMOTIVE ASSEMBLY
Filed Jan. 11, 1963
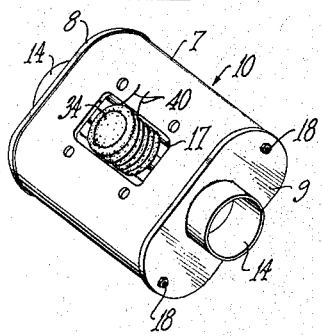
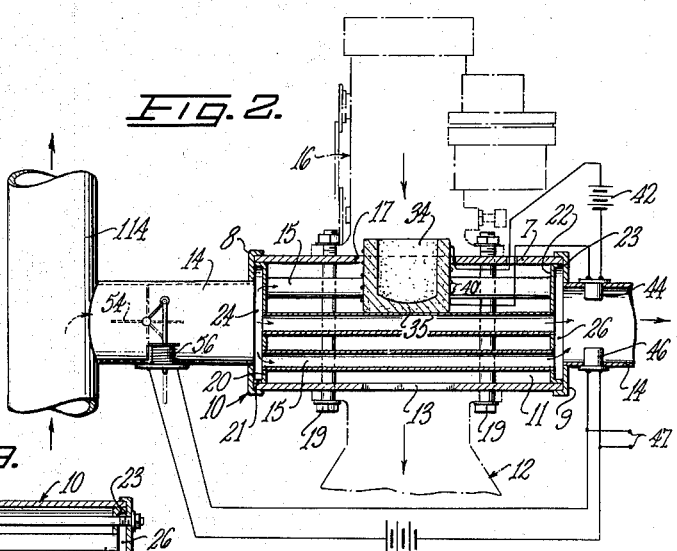
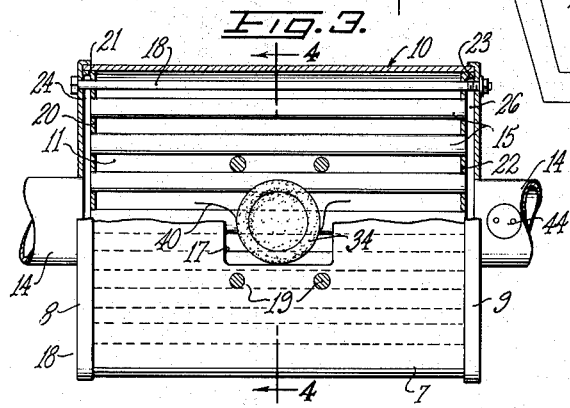
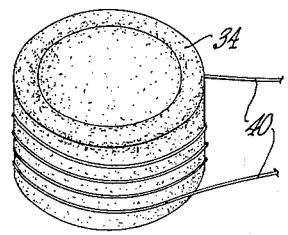
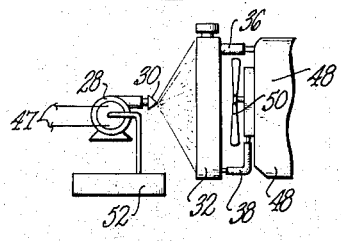
INVENTOR.
WILLIAM D. ULRICH
BY
Howard L. Johnson
ATTORNEY United States Patent Office 3,221,719
Patented Dec. 7, 1965

3,221,719
AUTOMOTIVE ASSEMBLY
William Denis Ulrich, North Redondo Beach, Calif., assignor to Gerald M. Hilby and Howard L. Johnson, both of Gardena, Calif., as equal tenants in common
Filed Jan. 11, 1963, Ser. No. 250,950
11 Claims. (Cl. 123—41.01)

In my pending application S.N. 14,792, filed March 14, 1960, of which this is a continuation-in-part, there was taught the use of a porous element (typically a cylindrical tube with a closed downstream-end) carrying an electrically energized heating coil, thru which heated porous element or tube, an automotive fuel-air mixture was passed substantially immediately prior to its introduction into the firing chamber of an internal combustion engine. In such manner a more complete combustion of the fuel is obtained, so as to decrease the ejection of partial oxidation products, and enable use of a "leaner" fuel mixture without concurrent power decrease or even with increase of power. In addition, the heating element facilitates initial start of a motor in a cold atmosphere; when used for this purpose alone, the heater can then be inactivated after the motor is warmed up. But even merely to effect a cold start, use of the porous element in addition to the heater, is advantageous.

Without necessarily relying upon such a theory or interpretation, it seems possible that rapid passage of the fuel dispersion thru the porous element may result in a physical disassociation of large agglomerations of the (gaseous) fuel component (even when it consists of a single ingredient, such as butane) so as to permit the more minute or "molecular" association of gaseous fuel particles with oxygen prior to ignition. In addition, the preheating provided by the coil may "adhesively" facilitate this momentary molecular-level association at the same time that it elevates the mixture partway to the combustion temperature; in addition of course it ensures the complete transformation of any remaining liquid phase so as to yield a "dry" charge.

It has now been found that, after an initial warm-up of the motor, such heating of the porous-passing air-fuel mixture can advantageously be accomplished by means of heat exchange with the engine exhaust stream. The latter can be passed immediately adjacent the porous element or tube (without intermingling the respective flow streams) in its location in the manifold throat, that is, intermediate the carburetor and the combustion chamber of the engine. After initial warm up, the electric coil can be de-energized and the continuous heating of the fuel-air mixture effected entirely by the engine exhaust. While it is recognized that engine exhaust streams have been employed for preheating intake fuel in the past, the result obtained was not at all comparable when the fuel-air mixture was not also passed substantially simultaneously thru a porous element in the form of a gaseous mixture.

In addition, the present heat-exchange means which are located so as to surround the porous tube (which typically extends or projects more-or-less centrally therein) serve to dissipate local areas of overheating which may occur when only the heated coil is employed with the tube. Further, the electrically energized coil may be connected for denergization by a thermostatic element located typically at the outlet end of the heat exchange. In addition, at a still higher temperature, such thermostatic element activates an ejection head which projects a spray of liquid refrigerant onto the radiator of the cooling system of the engine, thus preventing overheating or "vapor lock" of the engine. This last feature is of particular value when the engine is operated in a hot climate, especially after being charged with a fuel intended primarily for cold climate. Or expressed differently, by use of the present invention, the fuel (especially gasoline) no longer needs to be "custom tailored" to the particular climate wherein it is intended for use.

Further, since the more complete combustion of even a leaner fuel mixture after its passage through the porous element, often results in a higher combustion chamber temperature, all heat exchange may be discontinued prior to spraying the radiator. Likewise, the porous element may be used without any heating means.

Other objects and advantages will become apparent as the description proceeds, having particular reference to the drawings which illustrate a presently preferred embodiment of the invention wherein—

FIG. 1 is perspective view of my improved assembly unit by itself;

FIG. 2 is a longitudinal vertical sectional view, partly in elevation, showing the present unit attached in functional location between a carburetor (above) and engine manifold (below).

FIG. 3 is an enlarged view of the unit wherein the upper portion of the housing appears in horizontal section, with the lower portion shown in top plan view;

FIG. 4 is a transverse vertical sectional view along the line 4—4 of FIG. 3;

FIG. 5 is a perspective view, further enlarged, of the porous retort and heating coil; and FIG. 6 is a vertical elevation showing schematically a temperature-activated ejector head spraying the radiator of a water-cooled engine to eliminate vapor lock.

In association with a conventional internal combustion engine (not shown), my assembly unit 10 is functionally located between the carburetor 16 and the fuel-air intake manifold 12 of the engine, with the exhaust conduit by pass 14 from the engine also longitudinally traversing the assembly before its vaporous contents are vented to the atmosphere. The main engine exhaust line is represented (schematically) at 114.

Essentially the passage which conventionally connects the carburetor and engine manifold to convey the incoming mixture of fuel and air therebetween, now leads thru the main assembly chamber 11 so as to effect heat exchange between the indrawn vapor feed mixture and the final vaporous exhaust products, which latter are here conveyed thru the assembly unit 10 by a plurality of smaller heat-transmitting tubes 15. These thin-walled metallic tubes 15 are laterally separated and joined at both ends to the main exhaust conduit 14.

The assembly unit 10 is formed of a tubular wall 7 disposed between centrally apertured end plates 8, 9 to each of which, a segment of the exhaust conduit 14 is outwardly attached. Longitudinal bolts 18 connect the end plates to each other, and transverse bolts 19 traverse the wrap-around wall and terminally serve to secure the housing respectively to the carburetor 16 and manifold 12. Inset a short distance from each end plate 8, 9 is a generally parallel, internal mounting wall 20, 22 each having an out-turned, peripheral flange 21, 23 disposed in edge abutment with the adjacent end plate. Ends of the tubes 15 are sealingly mounted in corresponding openings of the walls 20, 22 so as to convey the flow of exhaust vapor of conduit 14 from the entrance vestibule 24 to the outlet area 26.

The lower face of the casing 7 which is held in frictional registration with the throat or inlet of the manifold 12 by the bolts 19, is formed with an outlet port 13, while opposite thereto (i.e. aligned with the carburetor outlet) is an inlet port 17 of analogous size, within which opening is (removably) mounted a dependent or inward projecting porous tube or retort 34, having its downstream end 35 closed, as described in my pending application cited earlier.

An electrical element or wire is wound about the sides of the generally cylindrical retort to form a heating coil 40 which is conveniently energized from the auto battery 42. A thermostatic element 44 such as a bimetallic switch is connected in the circuit and mounted at any desired location such as the outlet area 26. As here illustrated, the retort 34 substantially completely fills the surrounding inlet port 17 so that practically all of the air-fuel mixture from the carburetor 16 must pass thru the porous retort. This arrangement is particularly desirable for heavy duty engines including diesels. However, for racing engines there may be a smaller portion of the mixture which goes thru the pores of the retort, the rest entering the chamber 11 along the outer heated walls of the retort (i.e. directly contacting the coil 40). It will be observed also that the capacity of the chamber 11 is greater than its aligned inlet 17 and outlet 13 ports, so that (in addition to affording a greater area exposure of the tube walls 15) a desired turbulence is produced in the flow immediately prior to its introduction into the engine. This effects both a more complete mixture of the air and fuel components, and a more uniform heat exchange with the engine exhaust stream.

It will be recognized that in starting the engine in a cold climate, there will be no hot engine exhaust stream already in the line 14, and accordingly, that all preheating of the incoming fuel and air mixture must be achieved by the coil 40. The thermostat 44 can be set to inactivate the heating coil 40 at a predetermined temperature—this will of course vary somewhat with its particular location in the manifold throat or adjacent thereto. However, the same or another thermostat 46 can also be connected to activate (at a higher temperature) a pump 28 which operates an ejector head 30 to spray liquid refrigerant (such as fluor (and chlor) substituted methanes and ethanes, e.g. $CCl_2F_2$, $CHCl_2F$, $CH_3CClF_2$, etc.) which may be stored and/or ejected under pressure onto the radiator 32 of the engine's cooling system. Preferably such refrigerants are normally gaseous substances such as the preceding "freons" which, like carbon dioxide, can be compressed for storage in a non-gaseous state and hence absorb much heat and evaporate practically at once from the radiator surface upon release of such pressure by spray ejection. The engine's separate cooling system is usually based on recirculating water or other liquid in a closed system as by conduits 36, 38 joining the engine block 48 and radiator 32. An engine-driven fan 50 is generally present; instead of liquid circulation, an air cooled system may be used. Momentary or intermittent use of my refrigerant spray is particularly effective in preventing an overheated engine being immobilized by "vapor lock" as noted earlier. In addition, it enables the engine to be driven at a consistently higher temperature since it places an automatic ceiling on the amount of overheating. Since resort to a liquified refrigerant is had rather seldom, a comparatively long-lasting supply of the refrigerant can be contained in a fairly small tank 52 (of say 2 or 3 gallons capacity) since generally only a few ounces are ejected on any occasion. Preferably (at a lower temperature) the thermostat 46 by line 47 to solenoid 56 shuts the butterfly valve 54, closing bypass 14 to the exhaust gas (which is then completely vented through conduit 114).

As contrasted with perforated, sieve-like elements or gross filters used to strain solid particles from liquids, the present porous elements are the type known as "micronic filters," that is, their porosity makes them capable to filter particles so minute as to be measured in microns. In the engine intake manifold, such apertures pass the vaporous fuel-air mixture while breaking up and vaporizing any remaining droplets thereof. Since there are no solid particles being removed, the pores do not become clogged. However, porosity is available which is so small as to slow the rate of vapor flow and this is to be avoided; hence a pore size which begins to do this may be taken as the lower limit of effective or practical porosity. A simple means is to determine the smallest pore size (for a filter element of given thickness) which will pass plain air without appreciable slowing under the pull of the amount of vacuum obtainable under normal use in the particular engine. Such pore size or a little larger (but not smaller) may then be used to pass the fuel-air mixture in such engine.

Such ceramic porous elements are made from bauxite melted in an electric furnace, the resulting pigs being crushed and grains of desired pore size separated therefrom. The grains are then mixed with a ceramic bond, molded and kiln burned. Such elements having a "Fine" or "Medium" grade of porosity (average pore diameter up to about 0.02 inch or 0.60 mm.) are preferred. For example, a one-eighth thick porous element having about 25,000 to about 35,000 holes (of 0.003 inch diameter) per square inch was found quite adequate in a gasoline engine of 208 in.$^3$ displacement.

Porous metal filters having a desired pore size of about 0.001 inch to 0.020 inch are likewise available (Hydraulics & Pneumatics 14:86, November 1961). With either material, an upper limit of about 0.02 inch diameter pores and sufficient concentration of such pores that passage of free air would not be appreciably hindered under the operating (vacuum) pressure, may be considered optimal.

I claim:

1. In combination for use with an internal combustion engine which includes carburetor means and inlet means for receiving a fuel and air mixture from the carburetor means for combustion in the engine: a conduit extending from the carburetor means to the inlet means for carrying the fuel and air mixture from the carburetor means to the inlet means, a porous element disposed across the conduit for passage therethrough of the fuel and air mixture carried by the conduit, heat exchange means disposed adjacent said porous element and functionally adapted to continuously convey through itself a stream of hot exhaust products from said engine and thereby effect heat exchange with said fuel and air mixture, flow control means responsive to temperature in the vicinity of said heat exchange means and adapted at a predetermined temperature to regulate the flow of said hot exhaust products therethrough, said engine also having a separate cooling system comprising radiator means, conduit and circulation means adapted for moving a fluid coolant between the radiator means and engine for cooling the latter, and refrigerant container and ejector means responsive to said flow control means (at a predetermined higher temperature) for spraying a liquid refrigerant onto said radiator means to cool the same.

2. The combination of the preceding claim 1 wherein said heat exchange means are disposed at least in part within a chamber forming a lateral enlargement of said conduit which contains said porous element, and said porous element comprises a ceramic tube having a closed downstream and generally centrally disposed within said chamber.

3. In combination for use with an internal combustion engine which includes carburetor means and inlet means for receiving a fuel and air mixture from the carburetor means for combustion in the engine: a conduit extending from the carburetor means to the inlet means for carrying the fuel and air mixture from the carburetor means to the inlet means, a micronic filter element disposed across the conduit for passage therethrough of the fuel and air mixture carried by the conduit, heat exchange means surrounding said element and functionally adapted to convey through itself a stream of hot exhaust products from said engine and thereby effect heat exchange with the fuel and air mixture which passes through the micronic filter element, flow control means responsive to temperature in the vicinity of said heat exchange means and adapted at a predetermined temperature to regulate the flow of said hot exhaust products therethrough, said engine also having a separate cooling system comprising radiator means, conduit and circulation means adapted for moving a fluid coolant between the radiator means and engine for cooling the latter, and refrigerant container and ejector means responsive (at a predetermined higher temperature) to said flow control means for spraying a liquid refrigerant onto said radiator means to cool the same.

4. The combination of the preceding claim 3 wherein said micronic filter element is essentially a ceramic tube having a closed downstream end.

5. In combination with an internal combustion engine having means for directly heating a fuel and air intake mixture, plus associated heat exchange means adapted to receive and discharge hot exhaust products from said engine so as to effect heat exchange with said fuel and air mixture prior to introduction of the latter mixture into said engine: a separate cooling system comprising radiator means, conduit and circulation means adapted for moving a fluid coolant between the radiator means and engine for cooling the latter, and refrigerant container and ejector means responsive to elevated temperature in the vicinity of said heat exchange means for spraying a liquid refrigerant onto said radiator means to cool the same.

6. In combination with an internal combustion engine having a cooling system comprising radiator means, conduit and circulation means adapted for moving a fluid coolant between the radiator means and engine for cooling the latter; refrigerant container and ejector means responsive to elevated operating temperature of said engine, for ejecting a refrigerant spray onto said radiator means to cool the same.

7. The combination of the preceding claim 6 wherein said refrigerant spray consists essentially of normally gaseous substance contained and ejected under pressure.

8. The combination of the preceding claim 6 wherein said refrigerant spray consists essentially of normally gaseous substance contained and ejected in a liquid state under pressure.

9. The combination of the preceding claim 6 wherein said refrigerant spray comprises liquified $CCl_2F_2$.

10. The combination of the preceding claim 6 wherein said refrigerant spray comprises liquified $CHCl_2F$.

11. The combination of the preceding claim 6 wherein said refrigerant spray comprises liquified $CH_3CClF_2$.

References Cited by the Examiner

UNITED STATES PATENTS

| | | | |
|---|---|---|---|
| 1,269,252 | 6/1918 | Brown | 123—122 |
| 1,897,540 | 2/1933 | Timian | 123—122 |
| 2,103,947 | 12/1937 | Holmes | 123—122 |
| 2,411,204 | 11/1946 | Graziano | 123—122 |
| 2,414,296 | 1/1947 | Gill | 123—122 |
| 2,481,135 | 9/1949 | Maness et al. | 123—41.01 |
| 2,514,253 | 7/1950 | Partin | 123—41.49 |
| 2,867,996 | 1/1959 | Bullard | 123—41.49 |

KARL J. ALBRECHT, *Primary Examiner.*

FRED E. ENGELTHALER, RICHARD B. WILKINSON, *Examiners.*